(12) United States Patent
Cheng et al.

(10) Patent No.: US 12,530,646 B2
(45) Date of Patent: *Jan. 20, 2026

(54) SYSTEMS AND METHODS TO MEASURE AND VISUALIZE THRESHOLD OF USER WORKLOAD

(71) Applicant: Asana, Inc., San Francisco, CA (US)

(72) Inventors: Ye Cheng, Brooklyn, NY (US);
Matthew Stevens, Brooklyn, NY (US);
Melissa Adams, Brooklyn, NY (US)

(73) Assignee: Asana, Inc., San Francisco, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/633,968

(22) Filed: Apr. 12, 2024

(65) Prior Publication Data

US 2024/0257008 A1 Aug. 1, 2024

Related U.S. Application Data

(63) Continuation of application No. 17/684,217, filed on Mar. 1, 2022, now Pat. No. 12,026,649, which is a continuation of application No. 16/684,503, filed on Nov. 14, 2019, now Pat. No. 11,341,445.

(51) Int. Cl.
*G06Q 10/0633* (2023.01)
*G06Q 10/0631* (2023.01)
*G06Q 10/109* (2023.01)
*G06Q 10/1093* (2023.01)

(52) U.S. Cl.
CPC . *G06Q 10/0633* (2013.01); *G06Q 10/063118* (2013.01); *G06Q 10/1097* (2013.01)

(58) Field of Classification Search
None
See application file for complete search history.

(56) References Cited

U.S. PATENT DOCUMENTS

| 7,386,797 | B1 | 6/2008 | Chatterjee |
| 8,738,414 | B1 | 5/2014 | Nagar |
| 11,212,326 | B2 | 12/2021 | Faulkner |
| 11,783,253 | B1 | 10/2023 | Pelz |

(Continued)

OTHER PUBLICATIONS

Kroner, M. Schneider and J. Mori, "A Framework for Ubiquitous Content Sharing," in IEEE Pervasive Computing, vol. 8, No. 4, pp. 58-65, Oct.-Dec. 2009, doi: 10.1109/MPRV.2009.65 (Year: 2009).

(Continued)

*Primary Examiner* — Ivan R Goldberg
(74) *Attorney, Agent, or Firm* — Esplin & Associates, PC

(57) ABSTRACT

Systems and methods for measuring and visualizing threshold of user workload. Exemplary implementations may: manage environment state information describing units of work assigned to individual users within the collaboration environment, individual units of work having individual start dates and individual end dates; determine threshold information including individual values of a threshold parameter for the individual users; effectuate presentation of a user interface based on the values of the work unit parameter, the values of the threshold parameter for the individual users, and/or other information; and/or perform other operations.

20 Claims, 7 Drawing Sheets

(56) References Cited

U.S. PATENT DOCUMENTS

| | | | |
|---|---|---|---|
| 2004/0098291 A1* | 5/2004 | Newburn | G06Q 10/0631 |
| | | | 705/7.27 |
| 2004/0233235 A1 | 11/2004 | Rubin | |
| 2005/0144232 A1 | 6/2005 | Estrada | |
| 2005/0204297 A1 | 9/2005 | Banatwala | |
| 2005/0216381 A1 | 9/2005 | Banatwala | |
| 2008/0052358 A1 | 2/2008 | Beaven | |
| 2010/0169832 A1 | 7/2010 | Chang | |
| 2011/0069643 A1 | 3/2011 | Yoakum | |
| 2012/0054095 A1 | 3/2012 | Lesandro | |
| 2013/0073328 A1* | 3/2013 | Ehrler | G06Q 10/063118 |
| | | | 705/7.17 |
| 2015/0149173 A1 | 5/2015 | Korycki | |
| 2015/0178666 A1 | 6/2015 | Green | |
| 2016/0063192 A1* | 3/2016 | Johnson | G16H 40/20 |
| | | | 705/2 |
| 2016/0162819 A1 | 6/2016 | Hakman | |
| 2016/0292620 A1* | 10/2016 | De | G06Q 10/063118 |
| 2016/0352812 A1 | 12/2016 | Ahlgren | |
| 2018/0285149 A1* | 10/2018 | Bhandari | G06F 9/451 |
| 2018/0365626 A1 | 12/2018 | Mansour | |
| 2019/0340166 A1 | 11/2019 | Raman | |
| 2019/0347126 A1* | 11/2019 | Bhandari | G06F 9/4843 |
| 2020/0063333 A1 | 2/2020 | Mahanty | |
| 2020/0159507 A1 | 5/2020 | Bodin | |
| 2020/0160270 A1 | 5/2020 | Bodin | |
| 2020/0160377 A1 | 5/2020 | Bodin | |
| 2020/0160458 A1 | 5/2020 | Bodin | |
| 2020/0293975 A1 | 9/2020 | Faulkner | |
| 2021/0248161 A1 | 8/2021 | Leston | |
| 2021/0383261 A1 | 12/2021 | Hanna | |
| 2022/0284340 A1 | 9/2022 | Choudhary | |
| 2023/0061905 A1 | 3/2023 | Culver | |
| 2023/0239261 A1 | 7/2023 | David | |
| 2023/0308409 A1 | 9/2023 | Rosenstein | |
| 2024/0012661 A1 | 1/2024 | Sabo | |
| 2024/0281738 A1 | 8/2024 | Sabo | |
| 2024/0420087 A1 | 12/2024 | Sabo | |
| 2025/0165927 A1 | 5/2025 | Sabo | |
| 2025/0200143 A1 | 6/2025 | Varghese | |
| 2025/0200474 A1 | 6/2025 | Sabo | |

OTHER PUBLICATIONS

D. Surian, N. Liu, D. Lo, H. Tong, E.-P. Lim and C. Faloutsos, "Recommending People in Developers' Collaboration Network," 2011 18th Working Conference on Reverse Engineering, Limerick, Ireland, 2011, pp. 379-388, doi: 10.1109/WCRE.2011.53 (Year: 2011).

* cited by examiner

SYSTEMS AND METHODS TO MEASURE AND VISUALIZE THRESHOLD OF USER WORKLOAD

FIELD OF THE DISCLOSURE

The present disclosure relates to systems and methods to measure and visualize threshold of user workload.

BACKGROUND

Collaboration environments, sometimes referred to as integrated collaboration environments, may enable users to assign projects, tasks, and/or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to measure and visualize threshold of user workload. Collaboration environments may be able to show relative workloads for users/workers. In some implementations, a parameter on which workload is determined may be based on one or more of a quantity of units of work (such as tasks, milestones, and/or other units of work) currently assigned to the individual users, a quantity of units of time (e.g., hours and/or other units) associated with the units of work currently assigned to the individual users, a quantity of units of work production, and/or other measures. However, these measurements alone may not provide insight as to whether the users are working above, near, at, and/or below a threshold of the users(s) capabilities to perform. By measuring and visualizing such a threshold in relation to the units of work currently assigned to the users, managers may be provided with more insightful data as to whether individual users and/or groups of users are overloaded (which may lead to work falling through the cracks and/or worker "burnout") and/or underutilized (which may turn into disengagement). The threshold may be set by managers, users themselves, and/or dynamically determined based on user(s) history of completion (and/or incompletion) of units of work.

One or more implementations of a system to measure and visualize threshold of user workload may include one or more hardware processors configured by machine-readable instructions. The processor(s) may be configured to manage environment state information maintaining a collaboration environment. The collaboration environment may be configured to facilitate interaction by users with the collaboration environment. The environment state information may specify values of work unit parameters of the users. The values of the work unit parameters may describe units of work assigned to individual users within the collaboration environment. The individual units of work may have individual start dates and individual end dates. By way of non-limiting illustration, the values of the work unit parameters may describe a first unit of work currently assigned to a first user, one or more other units of work currently assigned to the first user, and/or one or more units of work assigned to one or more other users. The first unit of work may have a start date, an end date, and/or may be associated with other information.

The processor(s) may be configured to determine threshold information and/or other information. The threshold information may include individual values of a threshold parameter for the individual users and/or groups of users. The individual values of the threshold parameter may specify individual magnitudes of units of work in relation to the individual start dates and the individual end dates of the individual units of work. By way of non-limiting illustration, the threshold information may include a first value of the threshold parameter for the first user and/or other information. The first value may specify a first magnitude of units of work for the first user in relation to the start date and the end date of the first unit of work. The first magnitude of units of work may represent a threshold of the first user's capability to perform at least in relation to the start date and the end date.

The processor(s) may be configured to effectuate presentation of a user interface based on one or more of the values of the work unit parameter, the values of the threshold parameter for the individual users, and/or other information. An instance of the user interface may display the relationship between the individual magnitudes of units of work and the individual start dates and the individual end dates of the individual units of work. By way of non-limiting illustration, the user interface may display the relationship between the first magnitude of units of work and the start date and the end date of the first unit of work currently assigned to the first user.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
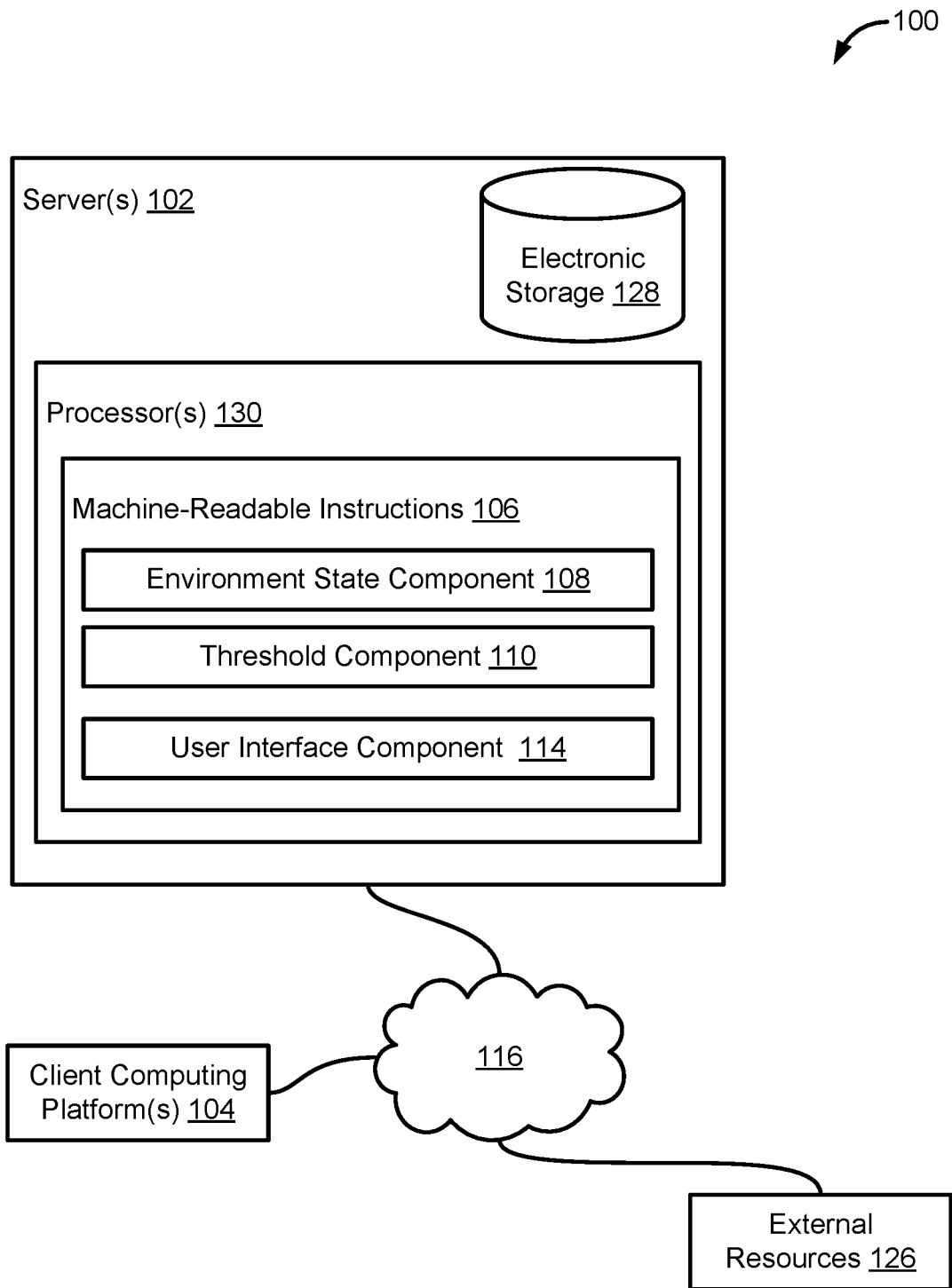
FIG. 1 illustrates a system configured to measure and visualize threshold of user workload, in accordance with one or more implementations.

FIG. 1 illustrates a system 100 configured to measure and visualize threshold of user workload, in accordance with one or more implementations. In some implementations, a parameter on which workload may be determined may be based on one or more of a quantity of units of work (such as tasks, milestones, and/or other units of work) currently assigned to the individual users, a quantity of units of time (e.g., hours and/or other units) associated with the units of work currently assigned to the individual users, a quantity of units of work production, and/or other measures. A parameter on which threshold of user workload (herein referred to as a "threshold parameter") may be determined may include values describing a magnitude of units of work in relation to start dates and end dates of the one or more units of work currently assigned to the users. The magnitude of units of work may be expressed as one or more of a quantity of units of work, a quantity of units of time, a quantity of units of work production, and/or other values. The magnitude of units of work may be specified with respect to a period of time (e.g., start dates and/or end dates of units of work0, an indefinite period of time, and/or based on other measures. A user interface may visualize a measure of currently assigned units of work along with the magnitude(s) representing threshold of workload. Within the user interface, a user may be able to time-shift, assign, reassign, and/or otherwise change current assignments of units of work.

In some implementations, system 100 may include one or more of one or more servers 102, one or more client computing platforms 104, external resources 126, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate measuring and visualizing threshold of user workload. The instruction components may include one or more of an environment state component 108, a threshold component 110, a user interface component 114, and/or other instruction components.

Environment state component 108 may be configured to manage environment state information and/or other information used in maintaining a collaboration environment. The environment state information may include one or more of user information, work information, and/or other information used to define, support, and/or otherwise maintain a collaboration environment.

The user information may include values of user parameters and/or other information. The values of the user parameters may be organized in user records corresponding to users interacting with and/or viewing the collaboration environment. The values of the user parameters associated with the users interacting with and/or viewing the collaboration environment may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may by way of non-limiting example, specify one or more of: a user name, a group parameter, a user account, user role information, a user department, descriptive user content, a to-email, a from-email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more work units the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of work units, the efficiency of the user, bandwidth of the user, activity level of the user, etc.), application access information (e.g., username/password for one or more third-party applications), one or more favorites and/or priorities, schedule information, other user parameters for the given user.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, a set of units of work, and/or other considerations. By way of non-limiting illustration, a role may include one or more of chief executive officer (or other officer), owner, manager, supervisor, accountant, associate, employee, entry level, midlevel, senior, administrator, director, foreman, engineer, product developer, human resource officer, artist, art director, and/or other description.

Schedule information for the individual users may include one or more calendar entries associated with the individual users. Individual calendar entries may be associated with the individual quantities of units of time to complete the calendar entries. The individual calendar entries may be associated with individual start dates and individual end dates.

In some implementations, schedule information may be stored locally within electronic storage 128 by virtue of features and/or functionality provided within a collaboration environment. By way of non-limiting illustration, a collaboration environment may have the features and/or functionality of calendar application configured to facilitate calendaring entries into a schedule. It is noted that schedule information may be determined through features and/or functionality provided by one or more external resources 126. By way of non-limiting illustration, an external resource may include a calendar application which may be external to a collaboration environment. The collaboration environment may have permissions to access the external calendar application to determine and/or obtain schedule information.

The work information may include values of one or more work unit parameters and/or other information. The values of the work unit parameters may be organized in work unit records corresponding to units of work managed, created, and/or assigned within the collaboration environment. A given work unit may have one or more assignees and/or team members working on the given work unit. Work units may include one or more to-do items, action items, objectives, and/or other units of work one or more users should accomplish and/or plan on accomplishing. Units of work may be created by a given user for the given user and/or created by the given user and assigned to one or more other users. A given unit of work may include one or more projects, tasks, sub-tasks, and/or other units of work possibly assigned to and/or associated with one or more users.

By way of non-limiting illustration, the one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, individual units of work may be described based on one or more of a unit of work name, a unit of work description, one or more unit of work dates (e.g., a start date, a due date, a completion date, and/or dates), individual quantities of units of time associated with the individual units of work, one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed work units in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hardcoded responses; and/or other parameters.), one or more interaction parameters (e.g., indicating a given unit of work is being worked on/was worked on, given work unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), dependencies between one or more work units, one or more custom fields (e.g., priority, cost, stage, and/or other custom fields), quantities of units of work production for the unit of work (e.g., quantity of lines of code, quantity of lines of copy, quantity of budget consumed, etc.), other work unit parameters for the given work units, and/or other work unit parameters, and/or user parameters for one or more users and/or work units the given project is associated with.

The values of the work assignment parameter describing units of work assigned to the individual users may be determined based on one or more interactions by one or more users with a collaboration environment. In some implementations, one or more users may create and/or assign one or more unit of work to themselves and/or one or more other users. In some implementations, a user may be assigned a unit of work and the user may effectuate a reassignment of the unit of work to one or more other users. In some implementations, assignment and/or reassignment of units of work may be facilitated through interactions with a user interface (see, e.g., user interface component 114, FIG. 5, and/or FIG. 6).

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

The individual units of work may be associated with one or more of individual quantities of units of time, individual quantities of units of work production, and/or other information. An individual unit of time may comprise one or more of a minute, an hour, a fraction (or percentage) of an hour, and/or other unit of time. In some implementations, users may provide input into a user interface of the collaboration environment comprising entry and/or selection of the individual quantities of units of time associated with individual units of work. In some implementations, the individual quantities of units of time associated with the individual units of work may be determined in relation to the individual start dates and the individual end dates of the individual units of work. By way of non-limiting illustration, environment state information may specify values of the work unit parameters describing a first unit of work currently assigned to a first user. The first unit of work may be associated with a start date, an end date, and/or other information. A first quantity of units of time may be associated with the first unit of work. An individual unit of work production may comprise one or more of a line of code, a line (and/or word, sentence, paragraph, and/or page) of copy, unit of budget consumed (e.g., dollar amount) and/or other unit of work production. In some implementations, the individual quantities of units of work production associated with the individual units of work may be determined in relation to the individual start dates and the individual end dates of the individual units of work.

In some implementations, determining the individual quantities of units of time associated with the individual units of work in relation to the individual start dates and the individual end dates may include determining individual quantities of units of time per day for individual days between the individual start dates and the individual end dates. The individual quantities of units of time per day for individual days between the individual start dates and the individual end dates may be determined by dividing the individual quantities of units of time associated with the individual units of work by the quantity of days spanning between the individual start dates and the individual end dates, inclusive. The quantity of days may include counts of workweek days (e.g., skipping weekend days) and/or may include weekend days. By way of non-limiting illustration, individual quantities of units of time per day for the individual days between the start date and the end date of the first unit of work may be determined. For example, the first quantity of units of time may be divided by the number of days spanning between the start date and the end date to determine individual quantities of units of time per day between the start date and the end date.

In some implementations, determining quantities of units of time associated with multiple overlapping units of work in relation to the individual start dates and the individual end dates may include aggregating, for individual days, the individual quantities of units of time per day determined for individual days. Aggregating may include adding. By way of non-limiting illustration, the first unit of work may have a second quantity of units of time determined for a particular day, and a second unit of work may have a third quantity of units of time determined for the same particular day. The second quantity of units of time may be aggregated with the third quantity of units of time for the particular day conveying an aggregated workload for that particular day.

In some implementations, the individual quantities of units of time per day determined for individual days may be determined based on schedule information and/or other information. By way of non-limiting illustration, individual quantities of units of time per day for individual days between the individual start dates and the individual end dates of calendar entries may be determined. The individual quantities of units of time per day for individual days associated with the calendar entries may be aggregated with the individual quantities of units of time per day determined for the individual days associated with units of work. Accordingly, in some implementations, workload per day may convey an aggregate of the individual quantities of units of time associated with the individual units of work with the individual quantities of units of time associated with the individual calendar entries.

In some implementations, describing the individual quantities of units of work production associated with the individual units of work in relation to the individual start dates and the individual end dates may include determining individual quantities of units of work production per day for individual days between the individual start dates and the individual end dates. The individual quantities of units of work production per day for individual days between the individual start dates and the individual end dates may be determined by dividing the individual quantities of units of work production associated with the individual units of work by the quantity of days spanning between the individual start dates and the individual end dates, inclusively. The quantity of days may include counts of workweek days (e.g., skipping weekend days) and/or may include weekend days.

In some implementations, describing quantities of units of work production associated with multiple units of work in relation to the individual start dates and the individual end dates may include aggregating, for individual days, the individual quantities of units of work production per day determined for individual days.

In some implementations, an individual role may be associated with individual quantities of units of time for individual units of work and/or quantities of units of work production for individual units of work. By way of non-limiting illustration, a user having a "manager" role may be automatically assigned a first predetermined quantity of units of time for a given unit of work, while an other user having an "employee" role may be automatically assigned a second predetermined quantity of units of time for the given unit of work. Users having other roles may be automatically assigned predetermined quantities of units of time and/or units of work production for individual units of work.

In some implementations, environment state information may be updated as users interact with the collaboration environment over time. The environment state component 108 may store and/or archive the environment state information periodically and/or based on user request to archive. The stored and/or archived environment state information may be referred to as historical environment state information and/or other information. In some implementations, the environment state component 108 may store historical environment state information specifying one or more of historical user information, historical work information, historical threshold information (see, e.g., threshold component 110), and/or other information. By way of non-limiting illustration, the historical environment state information may specify historical values of work unit parameters of the users and/or other information. The historical values of the work unit parameters may describe one or more of individual sets of units of work previously assigned to the individual users, individual historical quantities of units of time associated with individual units of work previously assigned to the individual users, individual historical quantities of units of work production associated with individual units of work previously assigned to the individual users, and/or other information. By way of non-limiting illustration, historical values of the work unit parameters of the first user may describe a set of units of work previously assigned to the first user. The set of units of work previously assigned to the first user may include a first quantity of units of work. The set of units of work previously assigned to the first user may be associated with a quantity of units of time. Individual quantities of units of time per day may be determined for the units of work included in the set of units of work previously assigned to the first user. For individual days, the individual quantities of units of time per day determined for the individual days may be aggregated.

Threshold component 110 may be configured to determine threshold information and/or other information. The threshold information may include individual values of a threshold parameter for individual users and/or for groups of users. The individual values of the threshold parameter may be expressed as individual magnitudes of units of work in relation to one or more of individual start dates and individual end dates of individual units of work, individual start dates and individual end dates of a set of units of work, an indefinite period of time, and/or specifications. By way of non-limiting illustration, the threshold information may include a first value of the threshold parameter for the first user. The first value may specify a first magnitude of units of work for the first user. The first magnitude may be expressed in relation to the start date and the end date of the first unit of work.

In some implementations, the threshold component 110 may be configured to determine the threshold information based on historical environment state information and/or other information. The historical environment state information may generally describe a user's previous performance capabilities with respect to completion (and/or incompletion) of units of work. The historical state information may describe whether units of work were completed on time, early, late, not completed, and/or other information about the units of work previously assigned to the users. Other information about the units of work previously assigned to the users may include reassignment of the units of work and/or other information. These previous measures may be used to set thresholds of workload in the future. By way of non-limiting illustration, the first value of the threshold parameter for the first user may be determined based on the historical values of the work unit parameters describing the set of units of work previously assigned to the first user.

In some implementations, individual magnitudes of units of work may be expressed as individual quantities of units of work with respect to one or more of a period of time, an indefinite period of time, and/or other measures. By way of non-limiting illustration, a value of a threshold parameter may specify a quantity of units of work as a work threshold for a given user over a certain period of time. By way of non-limiting illustration, a value may specify that a user's threshold for workload may be forty units of work for a particular month. By way of non-limiting illustration, a value may specify that a user's threshold for workload may be ten units of work for a particular week. By way of non-limiting illustration, a value may specify that a user's threshold for workload may be three units of work for a particular day.

In some implementations, individual magnitudes of units of work expressed as individual quantities of units of work may be determined based on historical environment state information and/or other information. In some implementations, a magnitude of units of work may correspond to quantities of units of work previously assigned to, and completed by, the users. In some implementations, a magnitude of units of work for a given period of time spanning an amount of days (and/or weeks and/or months) may correspond to a quantity of units of work previously assigned to, and completed by, a user during a past period spanning the same or similar amount of days (and/or weeks and/or months). By way of non-limiting illustration, the first magnitude of units of work may comprise a quantity of units of work included in the set of units of work previously assigned to the first user. The quantity of units of work may include the units of work in the set completed on time, all units of work included in the set, and/or other quantities. In some implementations, the set of units of work may be associated with a first quantity of days. The first magnitude of units of work may be specified with respect to a future span of time that may be the same as or similar to the first quantity of days.

In some implementations, individual magnitudes of units of work may be expressed as one or more of individual quantities of units of time with respect to one or more of a period of time, an indefinite period of time, individual quantities of units of work production with respect to one or more of a period of time, an indefinite period of time, and/or other measures. By way of non-limiting illustration, a value may specify that a user's threshold for workload may be 160 hours for a particular month. By way of non-limiting illustration, a value may specify that a user's threshold for workload may be 50 hours for a particular week. By way of non-limiting illustration, a value may specify that a user's threshold for workload may be eight and a half hours a day. By way of non-limiting illustration, a value may specify that a user's threshold for workload may be ten lines of copy per day.

In some implementations, individual magnitudes of units of work expressed as individual quantities of units of time may be determined based on historical environment state information and/or other information. In some implementations, a magnitude of units of work may correspond to a quantity of units of time associated with units of work previously assigned to, and completed by, a user. In some implementations, a magnitude of units of time for a given period of time spanning an amount of days (and/or weeks and/or months) may be expressed as a quantity of units of time associated with units of work previously assigned to, and completed by, a user during a past period spanning the same or similar amount of days (and/or weeks and/or months). By way of non-limiting illustration, the first magnitude of units of work may comprise a quantity of units of time associated with the set of units of work previously assigned to the first user. The quantity of units of time may include the units of time associated with one or more of the units of work in the set completed on time, all units of work included in the set, and/or other values. In some implementations, the set of units of time may be associated with the first quantity of days. The first magnitude of units of work may be set for the first user over a future span of time that may be the same as or similar to the first quantity of days.

In some implementations, individual magnitudes of units of work expressed as individual quantities of units of work production may be determined based on historical environment state information and/or other information. In some implementations, a magnitude of units of work may correspond to a quantity of units of work production associated with units of work previously assigned to, and completed by, a user. In some implementations, a magnitude of units of work production for a given period of time spanning an amount of days (and/or weeks and/or months) may be expressed as a quantity of units of work production associated with units of work previously assigned to, and completed by, a user during a past period spanning the same or similar amount of days (and/or weeks and/or months). By way of non-limiting illustration, a magnitude of units of work may comprise a quantity of units of work production associated with a set of units of work previously assigned to the first user. The quantity of units of work production may include the units of work production associated with one or more of the units of work in the set completed on time, all units of work included in the set, and/or other values. In some implementations, a set of units of work production may be associated with a quantity of days. The magnitude of units of work in units of work production may be set for the first user over a future span of time that may be the same as or similar to the first quantity of days.

The threshold component 110 may be configured to obtain user role information specifying individual roles of the individual users. In some implementations, individual roles may be associated with one or more values of the threshold parameter. The threshold component 110 may be configured to determine the threshold information based on the user role information and/or other information. The values associated with the role information may be assigned for one or more of a given unit of work, for a set of units of work (e.g., a project comprising more than one unit of work), a predetermined period of time, for an indefinite period of time, and/or other assignment. By way of non-limiting illustration, a user having a "manager" role may be automatically assigned a first predetermined value for the threshold parameter for one or more of a given unit of work, for a set of units of work, a period of time, for an indefinite period of time, and/or other assignment. An other user having an "employee" role may be automatically assigned a second predetermined value for the threshold parameter for one or more of a given unit of work, for a set of units of work, a period of time, for an indefinite period of time, and/or other assignment. Users having other roles may be automatically assigned other predetermined values for the threshold parameter.

In some implementations, threshold component 110 may be configured to determine the threshold information based on user input and/or other information. The user input may comprise user entry and/or selection of the individual values of the threshold parameter. The entry and/or selection may include specifications of individual magnitudes of units of work. A specification may include individual start dates and individual end dates, an indefinite period of time, and/or other specifications. In some implementations user input may be provided via a user interface (see, e.g., user interface component 114 in FIG. 1 and/or FIG. 8).

Threshold component 110 may be configured to determine threshold information and/or other information for individual groups of users. By way of non-limiting illustration, individual values of the threshold parameter for users in a group of users may be aggregated to determine a group value of the threshold parameter. Aggregating may include adding. The group of users may include users working on a same or similar project (including a same or similar set of units of work). The group value may provide a workload threshold for the group and/or project as a whole. Such information may provide insight as to whether the group or project is a whole is overstaffed, understaffed, and/or may require other changes. By way of non-limiting illustration, such information may facilitate reassignment of units of work, time-shifting of units of units of work, and/or other changes.

User interface component 114 may be configured to effectuate presentation of individual user interfaces on individual client computing platforms of one or more client computing platforms 104. For example, the individual client computing platforms may access information to effectuate presentation of a user interface over network 116. A given user interface may be configured to facilitate measuring and/or visualizing threshold of workload, assignment and/or reassignment of units of work, and/or other features and/or functionality.

The user interface component 114 may be configured to effectuate presentation of a user interface based on one or more of values of work unit parameters, values of the threshold parameter, and/or other information. The user interface may display, for individual users and/or individual groups of users, the relationship(s) between the individual magnitudes of units of work and individual start dates and the individual end dates of the individual units of work. By way of non-limiting illustration, a user interface may display, with respect to the first user, the relationship between the first magnitude of units of work and the start date and the end date of the first unit of work.

The user interface may include one or more user interface portions. By way of non-limiting illustration, a user interface may include one or more of an input portion, a display portion, and/or other portions. Individual portions may include one or more user interface elements configured to facilitate user interaction with the user interface. By way of non-limiting illustration, user interface elements may include one or more of text input field, drop down menus, check boxes, display windows, virtual buttons, sliding scales, and/or other elements configured to facilitate user interaction.

An input portion of a user interface may be configured to obtain user input comprising user entry and/or selection of the individual values of the threshold parameter and/or other information. The input portion may comprise one or more text input fields, one or more check boxes, one or more drop down menus, sliding scales, and/or other user interface elements configured to accept user entry and/or selection of the individual values of the threshold parameter and/or other information. By way of non-limiting illustration, a user interface may be configured to obtain user input comprising user entry and/or selection of individual magnitudes of units of work (in terms of one or more of quantity of units of work, quantity of units of time, and/or quantity of units of work production), individual start dates and the individual end dates, and/or other information.

In some implementations, a display portion may include one or more of a date axis representing calendar dates, a magnitude axis representing magnitude of units of work, and/or other components. The individual magnitudes of units of work may be shown relative the magnitude axis. The magnitude axis may represent the units of work based on one or more of quantity of units of work, units of time, units of work production, and/or other measures. The magnitude axis may include visual increments of one or more units of work, units of time, units of work production, and/or other measures. The relationship with the individual start dates and the individual end dates may be shown relative the date axis. The date axis may include visual increments of days.

A user interface may visualize individual quantities of units of time (and/or units of work production) associated with the individual magnitudes of units of work in relation to the individual start dates and the individual end dates based on one or more plot lines. A height of a plot line may represent one or more of a quantity of units of work, a quantity of units of time (and/or units of work production), and/or other measures. A length of a plot line may represent the time span for which a given quantity of units of work and/or quantity of units of time (and/or units of work production) may apply.

In some implementations, a display portion may include a unit of work display portion providing a visualization of the individual units work in relation to individual start dates and/or end dates. By way of non-limiting illustration, individual units of work may be represented by individual user interface elements. The interface elements representing the individual units of work may be visualized in relation to the start dates and end dates based on a length of the individual interface elements spanning the date axis. In some implementations, a unit of work display portion may be configured to facilitate assignment, reassignment, and/or time-shifting of individual units of work. By way of non-limiting illustration, the individual user interface elements representing units of work may be selectable by a user of the user interface. The selection of a user interface element may allow the user to shift a position of the user interface element along the date axis of the user interface to time-shift the associated unit of work. The selection of a user interface element may allow the user to reposition the user interface element from one user to another to facilitate a reassignment of the unit of work (e.g., resulting in an update of values of work assignment parameters and/or other updates). User selection may be facilitated by drag-and-drop operations and/or other user interface interaction operations.

Figure 3:
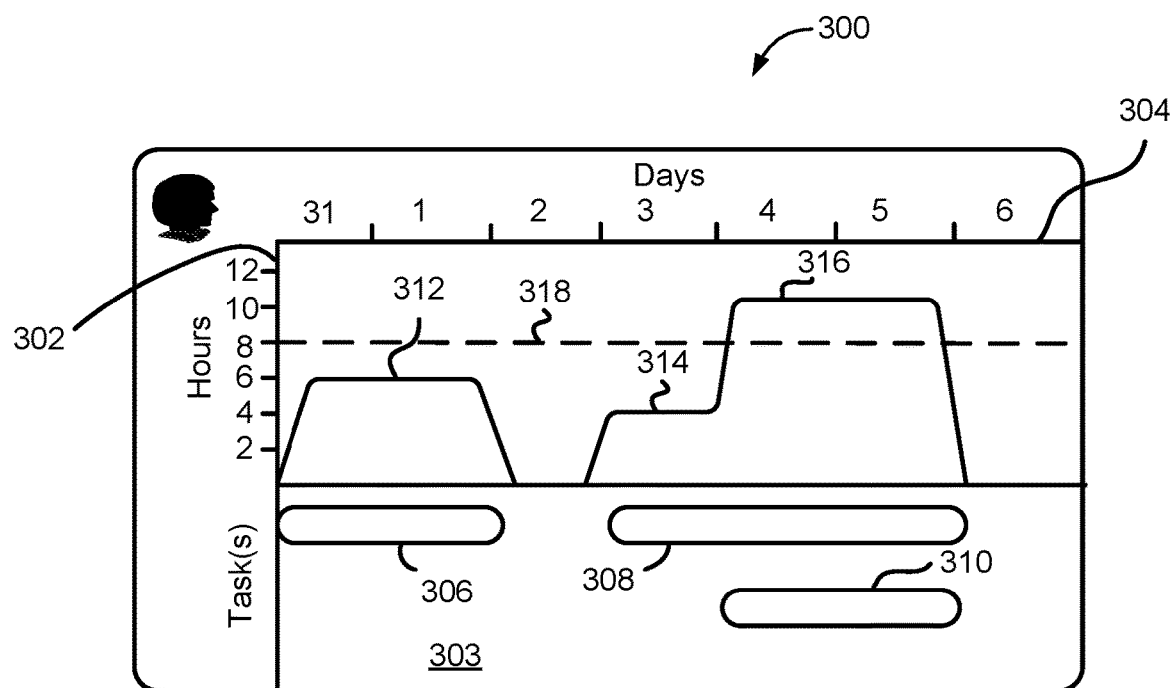
FIG. 3 illustrates an exemplary user interface, in accordance with one or more implementations.

FIG. 3 illustrates an exemplary user interface 300 visualizing threshold of user workload, in accordance with one or more implementations. The user interface 300 may display relationships between the individual magnitudes of units of work and individual start dates and individual end dates. The user interface 300 may include one or more of a date axis 304 representing calendar dates, a magnitude axis 302 representing magnitudes of units of work in the form of units of time, a unit of work display portion 303, and/or other components. The individual quantities of units of time associated with the magnitudes of units of work may be shown relative the magnitude axis 302. The relationship of the individual magnitudes of units of work with the individual start dates and the individual end dates may be shown relative the date axis 304. Interface elements representing the individual units of work (described for illustrative purposes as "task(s)") in relation to the start dates and end dates may be shown in the unit of work display portion 303. While some descriptions of features in user interface 300 herein may be directed to units of time, this is for illustrative purposes only and not to be considered limiting. Instead, it is noted that those skilled in the art may understand the application of these features may extend, mutatis mutandis, to quantities of units of work production.

By way of non-limiting illustration, the units of work associated with a user may include one or more of a first unit of work 306, a second unit of work 308, a third unit of work 310, and/or other units of work. The first unit of work 306 may have a start date of the thirty-first of one month and an end date of the first of the following month. This relationship may be shown by the first unit of work 306 being represented by a user interface element spanning the portion of the date axis 304 illustrating the thirty-first of one month to the first of the following month. The second unit of work 308 may have a start date of the third of the month and an end date of the fifth of the month. This relationship may be shown by the second unit of work 308 being represented by a user interface element spanning the portion of the date axis 304 illustrating the third of the month to the fifth of the month. The third unit of work 310 may have a start date of the fourth of the month and an end date of the fifth of the month. This relationship may be shown by the third unit of work 310 being represented by a user interface element spanning the portion of the date axis 304 illustrating the fourth of the month to the fifth of the month.

The user interface 300 may visualize individual magnitudes of units of work based on one or more lines plotted with respect to the date axis 304 and the magnitude axis 302. The height of a line in FIG. 3 may represent a quantity of units of time (shown for illustrative purposes in increments of 2 hours). The length of a line may represent a time relationship of the individual magnitudes of units of work. By way of non-limiting illustration, a given value of the threshold parameter may be visualized by a magnitude of units of work plot line 318 for a user. In the FIG. 3 illustration, the magnitude of units of work plot line 318 is shown as being set over in indefinite amount of time, in this example, eight hours.

The user interface 300 may visualize, via plot lines, the individual quantities of units of time associated with the individual units of work in relation to individual start dates and individual end dates. By way of non-limiting illustration, the first unit of work 306 may be associated with a first quantity of units of time. The first quantity may include, for illustrative purposes, 12 hours. Since the first unit of work 306 spans two days and is associated with 12 hours, then the individual quantities of units of time per day for individual days between the start date and the end date may comprise 6 hours per day. This may be illustrated by a first plot line 312 having a length spanning between the thirty first of the prior month to the first of the following month, and a height of 6 hours. The second unit of work 308 may be associated with a second quantity of units of time. The second quantity may include, for illustrative purposes, 12 hours. Since the second unit of work 308 spans 3 days and is associated with 12 hours, then the individual quantities of units of time per day for individual days between the start date and the end date may comprise 4 hours per day. The third unit of work 310 may be associated with a third quantity of units of time. The third quantity may include, for illustrative purposes, 12 hours. Since the third unit of work 310 spans 2 days and is associated with 12 hours, then the individual quantities of units of time per day for individual days between the start date and the end date may comprise 6 hours per day. The second unit of work 308 and third unit of work 310 may overlap (on the fourth and fifth days of the month). Accordingly, a plot line spanning between the third day of the month to the fifth day of the month may comprise a first portion 314, a second portion 316, and/or other line portions. The first portion 314 may represent a non-overlapped day (the third day of the month) and may have a height providing a visualization of the quantity of units of time per day determined for the second unit of work 308 (e.g., 4 hours). The second portion 316 spanning the fourth day and fifth day of the month may have a height representing an aggregate of the individual quantities of units of time per day determined for both the second unit of work 308 and the third unit of work 310, e.g., 10 hours (4 hours plus 6 hours).

A user viewing the user interface 300 of FIG. 3 may determine that the illustrated user is over threshold (e.g., overloaded with work) on the fourth and fifth days of the month. It is noted that FIG. 3 is for illustrative purposes only and is not to be considered limiting. Instead, it is to be understood that the user interface 300 may be configured in other ways and/or including other elements in accordance with one or more implementations of the system 100 presented herein.

Figure 4:
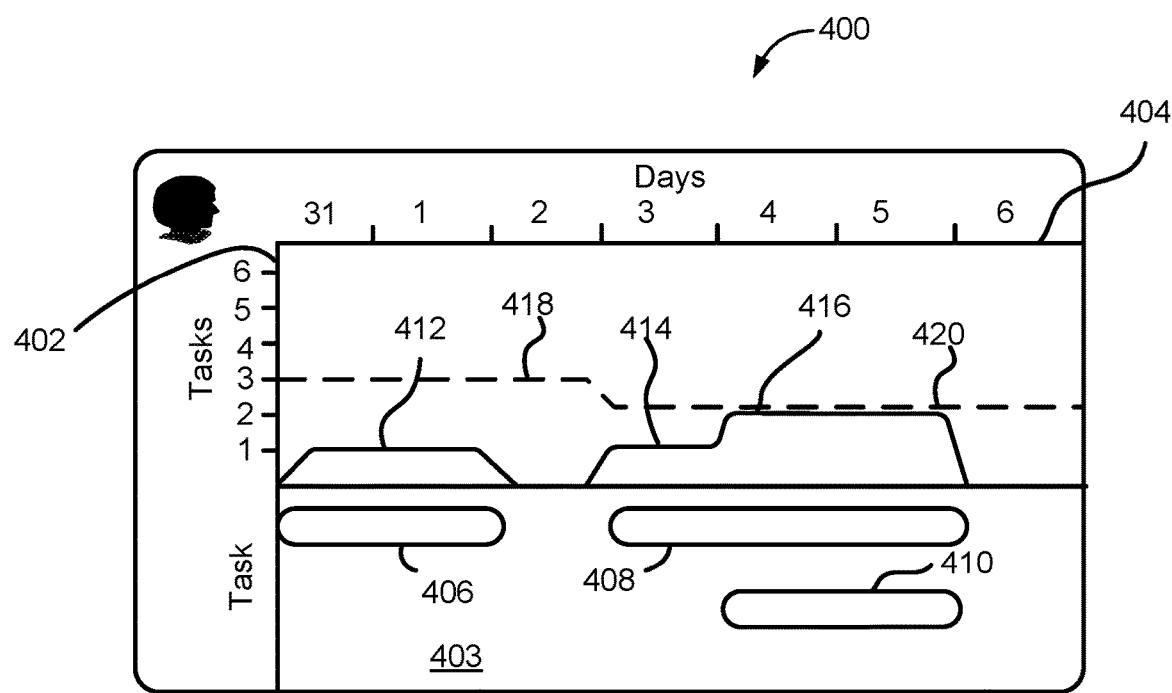
FIG. 4 illustrates an exemplary user interface, in accordance with one or more implementations.

FIG. 4 illustrates another exemplary user interface 400 visualizing threshold of user workload, in accordance with one or more implementations. The user interface 400 may display relationships between the individual magnitudes of units of work and individual start dates and individual end dates. The user interface 400 may include one or more of a date axis 404 representing calendar dates, a magnitude axis 402 representing magnitudes of units of work in the form of quantity of units of work, a unit of work display portion 403, and/or other components.

By way of non-limiting illustration, the units of work associated with a user may include one or more of a first unit of work 406, a second unit of work 408, a third unit of work 410, and/or other units of work. The first unit of work 406, second unit of work 408, and third unit of work 410 may be arranged with similar start and end dates as shown in FIG. 4.

The user interface 400 may visualize individual magnitudes of units of work based on one or more lines plotted with respect to the date axis 404 and the magnitude axis 402. A value of the threshold parameter may be visualized by a magnitude of units of work plot line 418 for a user from the thirty-first of the month to the second of the following month. A value of the threshold parameter may be visualized by a magnitude of units of work plot line 420 for the user from the third of the month onward. In the FIG. 4 illustration, the magnitude of units of work plot line 418 may comprise 3 units of work; and the magnitude of units of work plot line 420 may comprise 2 units of work.

The user interface 400 may visualize, via plot lines, the individual quantities of units of work in relation to individual start dates and individual end dates. By way of non-limiting illustration, the first unit of work 406 may be the only unit of work spanning the two days between the thirty-first and the first. This may be illustrated by a first plot line 412 having a length spanning between the thirty first of the prior month to the first of the following month, and a height of one task. The second unit of work 408 may be the only unit of work spanning the third day of the month. This may be visualized by a first portion 414 spanning the third day of the month and having a height of one task. The second unit of work 408 and the third unit of work 410 may both span the fourth and fifth days of the month. This may be visualized by a second portion 416 spanning the fourth and fifth days and having a height of two tasks. While some descriptions of features in user interface 400 herein may be directed to units of work, this is for illustrative purposes only and not to be considered limiting. Instead, it is noted that those skilled in the art may understand the application of these features may extend, mutatis mutandis, to quantities of units of work production.

A user viewing the user interface 400 of FIG. 4 may determine that the illustrated user is under and/or within threshold (e.g., at and/or under capacity) for the dates shown. It is noted that FIG. 4 is for illustrative purposes only and is not to be considered limiting. Instead, it is to be understood that the user interface 400 may be configured in other ways and/or including other elements in accordance with one or more implementations of the system 100 presented herein.

Figure 5:
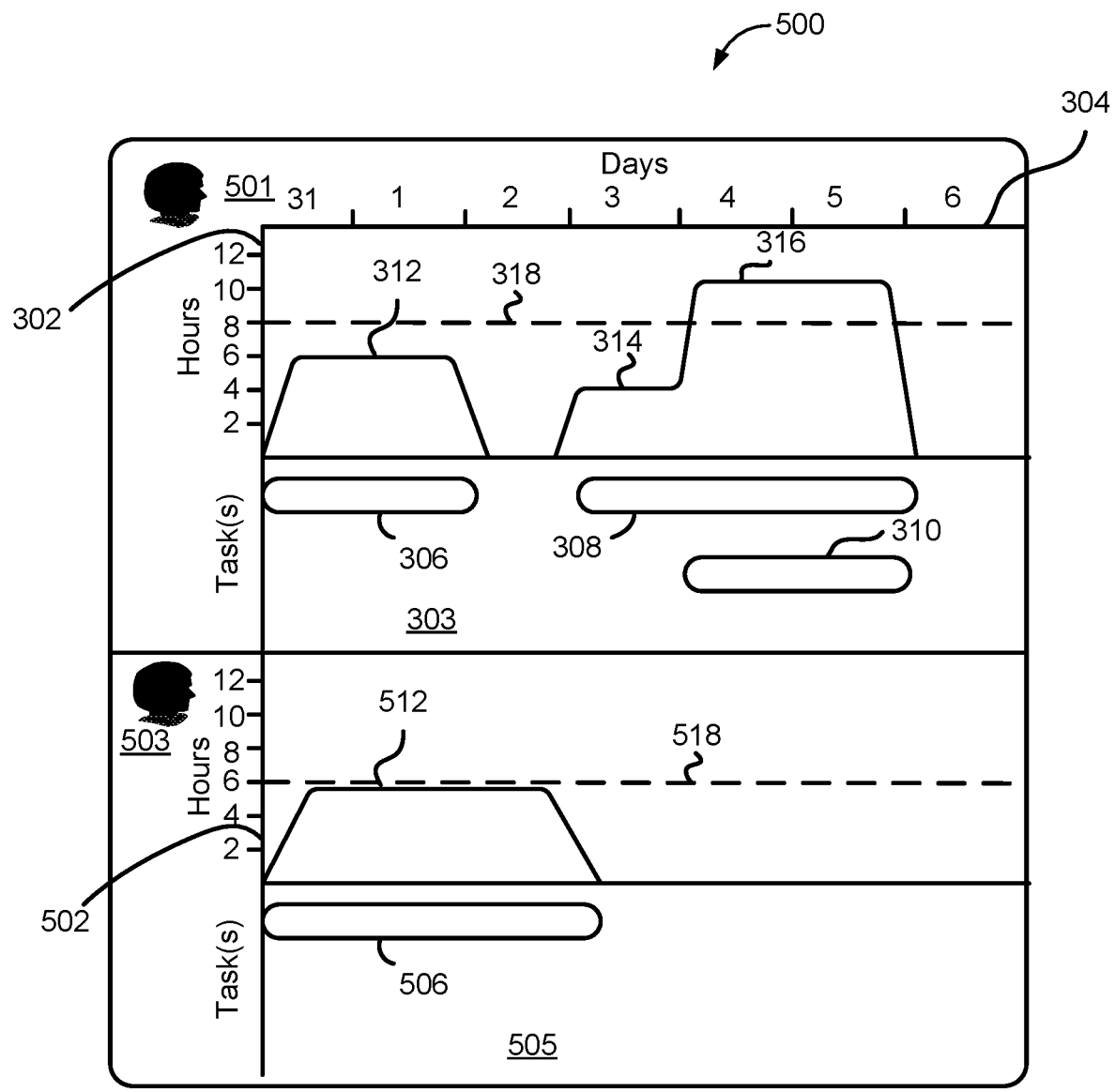
FIG. 5 illustrates an exemplary user interface, in accordance with one or more implementations.

FIG. 5 illustrates an exemplary user interface 500 visualizing threshold of user workload for multiple users (e.g., a first user 501 and a second user 503), in accordance with one or more implementations. The user interface 500 may display relationships between the individual magnitudes of units of work and individual start dates and individual end dates. The user interface 500 may include one or more of a date axis 304 representing calendar dates, a magnitude axis 302 representing magnitudes of units of work in the form of units of time for the first user 501, a unit of work display portion 303 for the first user 501, a magnitude axis 502 representing magnitudes of units of work in the form of units of time for the second user 503, a unit of work display portion 505 for the second user 503, and/or other components. The elements in the top portion of the user interface 500 directed to the first user 501 may include similar components represented by similar reference numerals as illustrated in FIG. 3. The bottom portion may comprise a visualization specific to the second user 503. By way of non-limiting illustration, a value of a threshold parameter for the second user 503 may be visualized by a magnitude of units of work plot line 518. In the illustration, the magnitude of units of work plot line 518 may represent a magnitude of 6 hours per day for an indefinite amount of time.

The units of work associated with the second user 503 may include a fourth unit of work 506, and/or other units of work. The fourth unit of work 506 may have a start date of the thirty-first of one month and an end date of the second of the following month. This relationship may be shown by the fourth unit of work 506 being represented by a user interface element spanning the portion of the date axis 304 illustrating the thirty-first of one month to the second of the following month. The fourth unit of work 506 may be associated with a fourth quantity of units of time. The fourth quantity may include, for illustrative purposes, 18 hours. Since the fourth unit of work 506 spans three days and is associated with 18 hours, then the individual quantities of units of time per day for individual days between the start date and the end date may comprise 6 hours per day. This may be illustrated by a third plot line 512 having a length spanning between the thirty first of the prior month to the second of the following month, and a height of 6 hours.

It is noted that FIG. 5 is for illustrative purposes only and is not to be considered limiting. Instead, it is to be understood that the user interface 500 may be configured in other ways and/or including other elements in accordance with one or more implementations of the system 100 presented herein.

A user viewing the user interface 500 of FIG. 5 may determine that the first user 501 is over threshold (e.g., overloaded with work) on the fourth and fifth days; and the second user is under threshold (e.g., no work assigned) from the third day onward. Accordingly, the user interface 500 may be configured to facilitate assignment and/or reassignment of tasks from the first user 501 to the second user 503. For illustrative purposes, it may be desired to reassign the third unit of work 310 from the first user 501 to the second user 503. By way of non-limiting illustration, a user viewing the user interface 500 may select the user interface element representing the third unit of work 310 and perform a drag-and-drop operation to position the third unit of work 310 within the unit of work display portion 505 of the second user 503 (FIG. 6).

Figure 6:
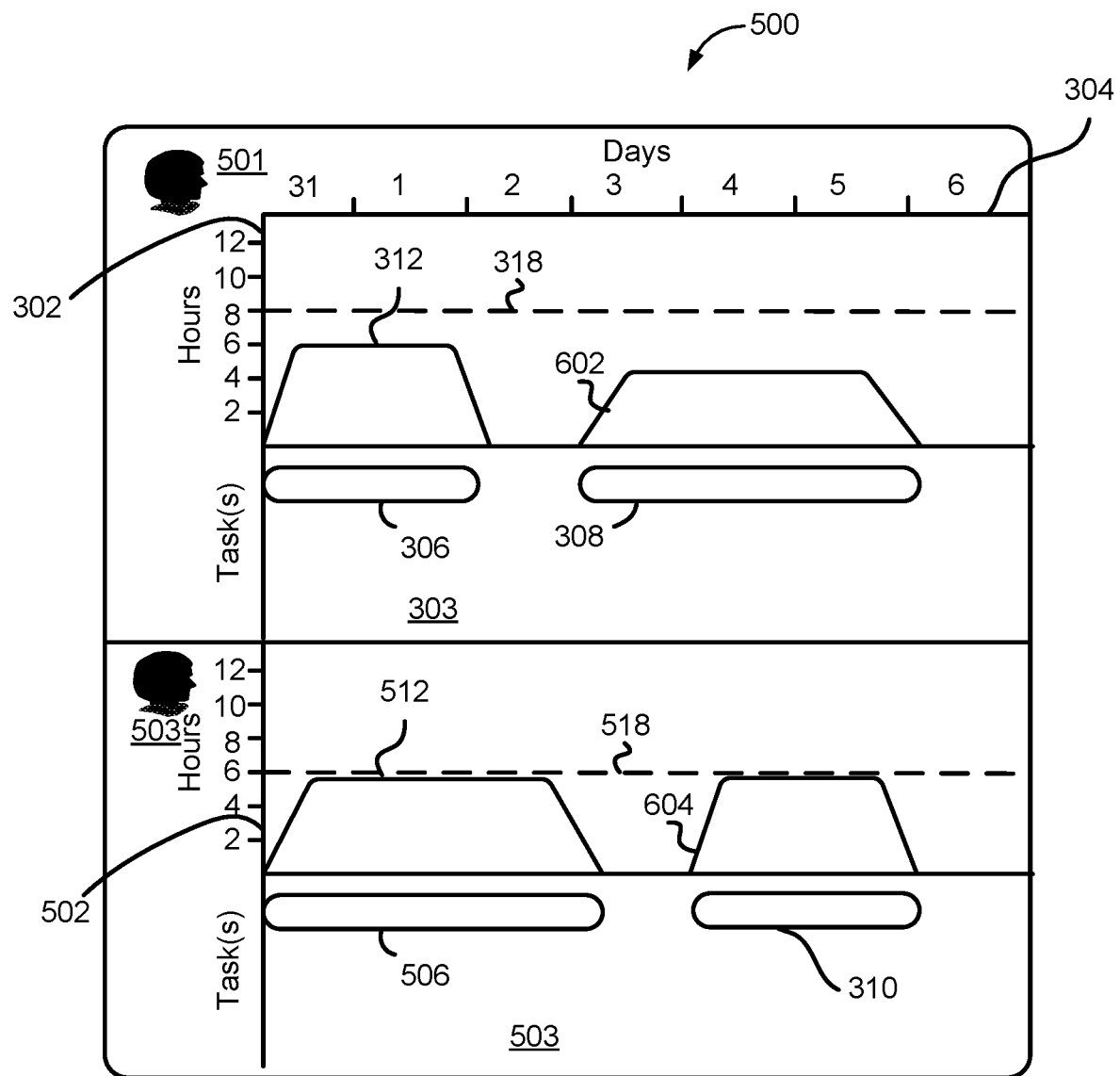
FIG. 6 illustrates an exemplary user interface, in accordance with one or more implementations.

FIG. 6 illustrates the user interface 500 resulting from the reassignment of the third unit of work 310 described above. As shown, the units of work associated with the first user 501 may include the first unit of work 306 and the second unit of work 308. A plot line 602 is now shown which represents the individual quantities of units of time per day for individual days between the start date and the end date of the second unit of work 308.

The units of work associated with the second user 503 may now include the third unit of work 310 and the fourth unit of work 506. Since the third unit of work 310 spans 2 days and is associated with 12 hours, then the individual quantities of units of time per day for individual days between the start date and the end date may comprise 6 hours per day. Accordingly, a plot line 604 may be determined which spans between the fourth and fifth days of the month and has a height of 6 hours. A user viewing the user interface 500 of FIG. 6 may determine that the first user 501 and the second user 503 are both at, or under, threshold.

Figure 7:
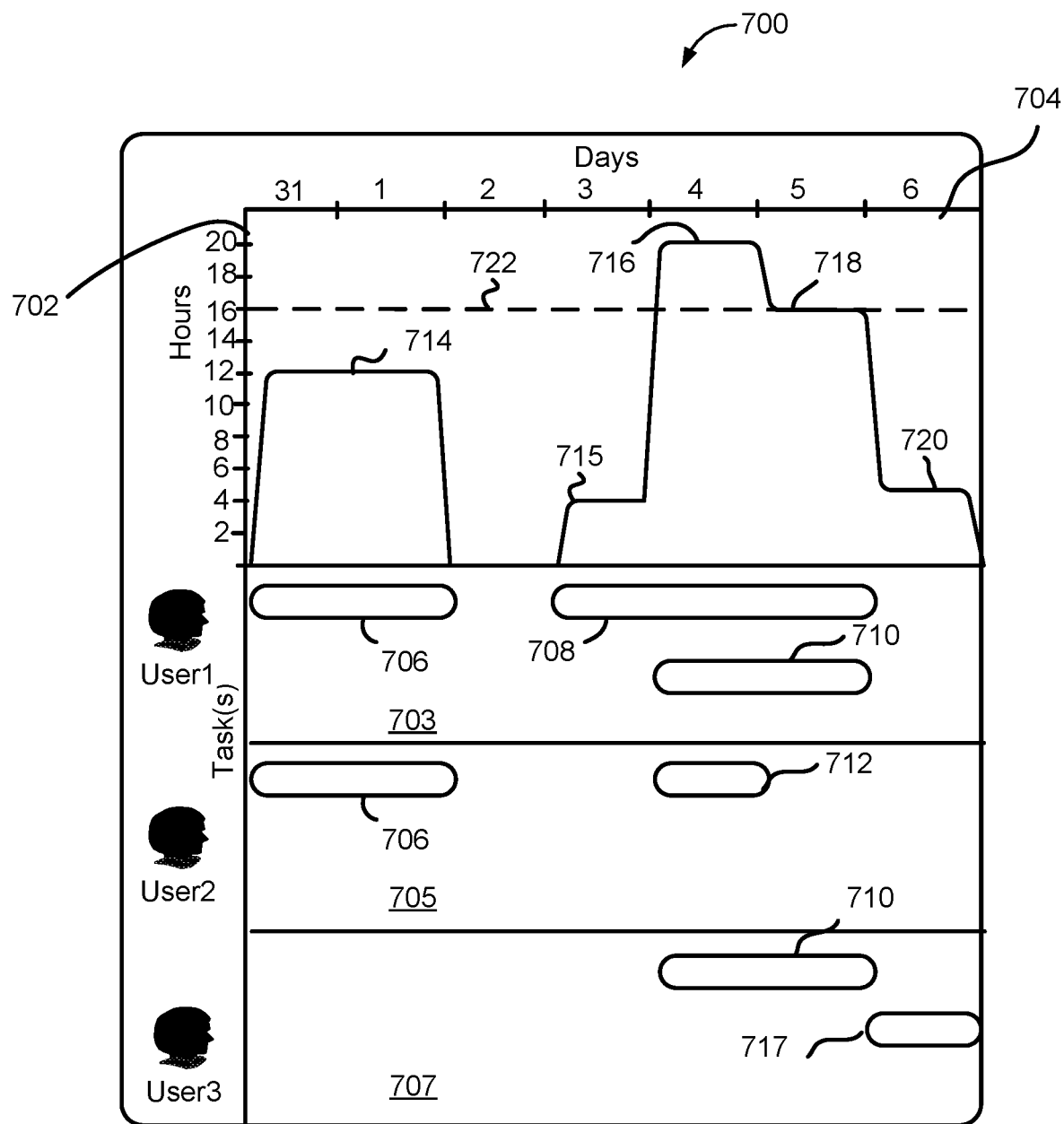
FIG. 7 illustrates an exemplary user interface, in accordance with one or more implementations.

FIG. 7 illustrates an exemplary user interface 700 visualizing threshold of user workload for a group of users (e.g., User1, User2, and User3), in accordance with one or more implementations. The user interface 700 may display relationships between the individual magnitudes of units of work and individual start dates and individual end dates for the group of users. The user interface 700 may include one or more of a date axis 704 representing calendar dates, a magnitude axis 702 representing magnitudes of units of work in the form of units of time for the group, a unit of work display portion 703 for User1, a unit of work display portion 705 for User2, a unit of work display portion 707 for User3, and/or other components. A group value of a threshold parameter for the group may be visualized by a magnitude of units of work plot line 722. In the illustration, the magnitude of units of work plot line 722 may represent a magnitude of 16 hours per day for an indefinite amount of time.

The units of work associated with User1 may include one or more of a first unit of work 706, a second unit of work 708, a third unit of work 710, and/or other units of work. The units of work associated with User2 may include one or more of the first unit of work 706, a fourth unit of work 712, and/or other and/or other units of work. The units of work associated with User3 may include one or more of the third unit of work 710, a fifth unit of work 717, and/or other units of work. A plot line 714 may represent an aggregate of quantity of units of time for the group associated with the first unit of work 706 being assigned to User1 and User2. A first line portion 715 may represent a quantity of units of time associated with the second unit of work 708 being assigned to User1. A second line portion 716 may represent an aggregate of quantity of units of time for the group associated with the second unit of work 708, the third unit of work, and the fourth unit of work 712. A third line portion 718 may represent an aggregate of quantity of units of time for the group associated with the second unit of work 708 and the third unit of work 710 as assigned to both User1 and User3. A fourth line portion 720 may represent an aggregate of quantity of units of time for the group associated with the fifth unit of work 717.

Figure 8:
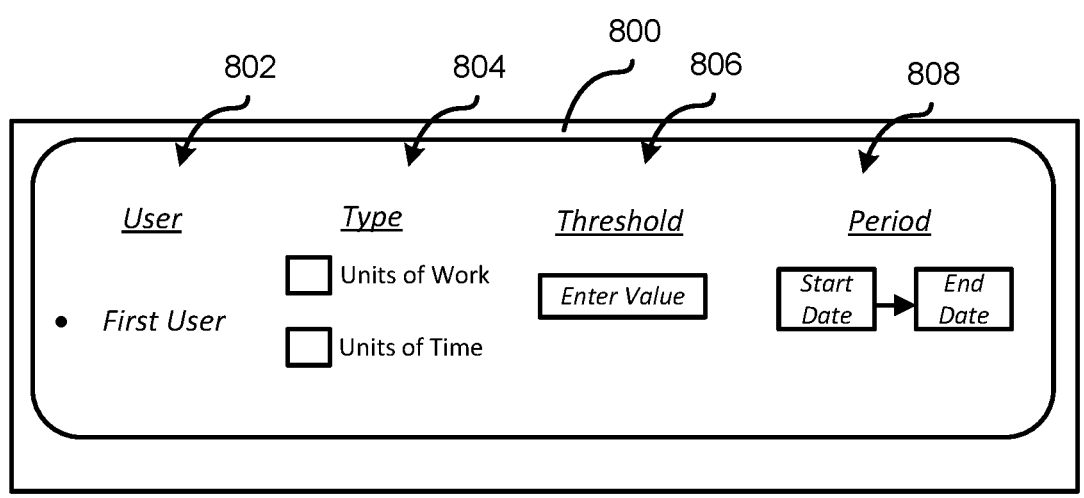
FIG. 8 illustrates an exemplary user interface, in accordance with one or more implementations.

FIG. 8 illustrates a user interface 800 configured to obtain user entry and/or selection of values of a threshold parameter, in accordance with one or more implementations. The user interface 800 may include one or more user interface elements configured to facilitate user interaction with the user interface 400. In some implementations, the user interface 800 may include a portion 802 showing individual users for which one or more values may be specified, a portion 804 showing options for the type of value which may be specified for a magnitude (e.g., units of work, units of time, and/or units of work production), a portion 806 for receiving input to specify a magnitude, a portion 808 for receiving input to specify a start date and/or end date. By way of non-limiting illustration, the portion 804 may include check boxes; the portion 806 may include a text-input field; and the portion 808 may include a set of text-input fields. It is noted that FIG. 8 is for illustrative purposes only and is not to be considered limiting. Instead, it is to be understood that the user interface 800 may be configured in other ways and/or including other elements to facilitate other user interaction in accordance with one or more implementations of the system 100 presented herein.

Returning to FIG. 1, the environment state component 108 may be configured to obtain indication of completion of the individual units of work. Completion of individual units of work may be indicated by user input via the collaboration environment selecting "mark complete" (or other input) for the individual units of work. The indications of the completion of the individual units of work may be associated with individual completion dates on which the indications were received.

The threshold component 110 may be configured to determine individual actual quantities of units of time (and/or units of work production) associated with the individual units of work upon obtaining an indication of completion of the individual units of work. The actual quantities of units of time (and/or units of work production) may be determined by determining a span of days between the individual start dates of the individual units of work and the individual completion dates. The span of days may be multiplied by the individual quantities of units of time (and/or units of work production) per day determined for the individual units of work. The result of the multiplication may comprise the individual actual quantities of units of time (and/or actual quantities of units of work production). The environment state component 108 may be configured to store and/or archive (e.g., as historical environment state information) the actual quantities of units of time (and/or units of work production) associated with the individual units of work upon obtaining an indication of completion of the individual units of work.

The threshold component 110 may be configured to update the threshold information based on one or more of completed ones of the individual units of work, the actual quantities of units of time associated with the completed individual units of work, the actual quantities of units of work production associated with the completed individual units of work, and/or other information. Thus, the determination of threshold information based on historical state information may be continually updated as users complete units of work.

In FIG. 1, in some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 114, and/or other components. Processor(s) 130 may be configured to execute components 108, 110, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 114 are illustrated in FIG. 1 as being implemented within a single processing unit, in implementations in which processor(s) 130 includes multiple processing units, one or more of components 108, 110, and/or 114 may be implemented remotely from the other components. The description of the functionality provided by the different components 108, 110, and/or 114 described below is for illustrative purposes, and is not intended to be limiting, as any of components 108, 110, and/or 114 may provide more or less functionality than is described. For example, one or more of components 108, 110, and/or 114 may be eliminated, and some or all of its functionality may be provided by other ones of components 108, 110, and/or 114. As another example, processor(s) 130 may be configured to execute one or more additional components that may perform some or all of the functionality attributed below to one of components 108, 110, and/or 114.

Figure 2:
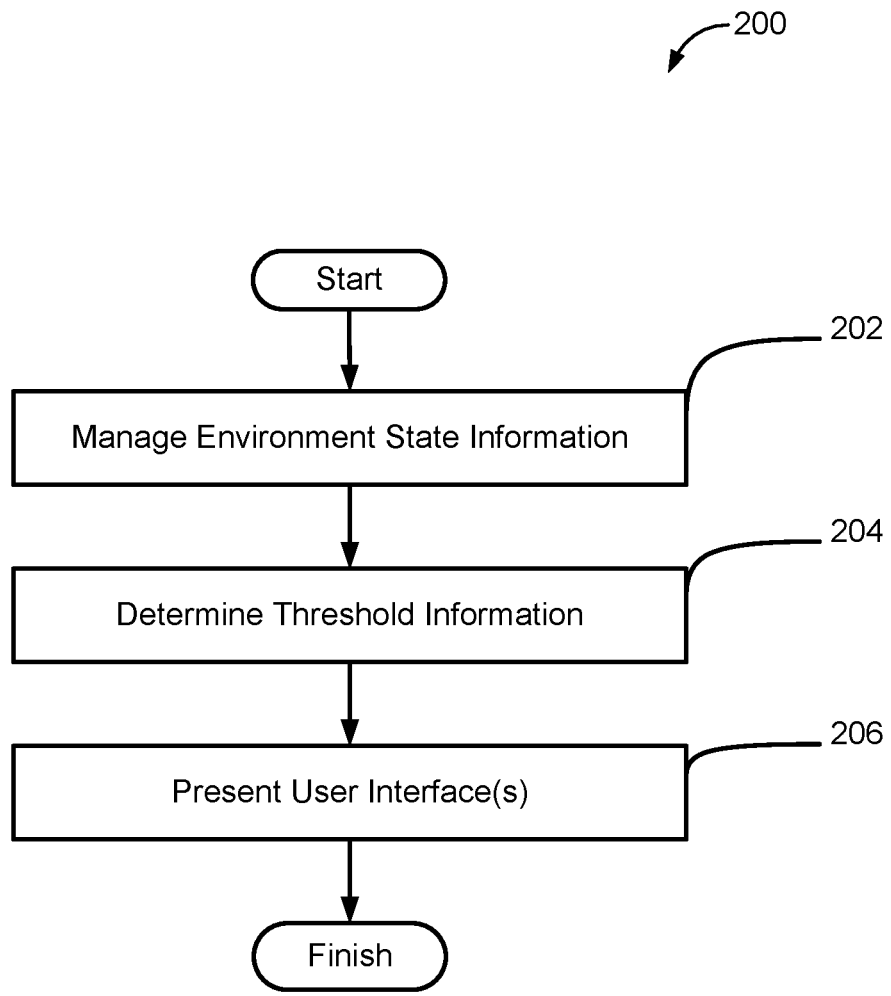
FIG. 2 illustrates a method to measure and visualize threshold of user workload, in accordance with one or more implementation

FIG. 2 illustrates a method 200 to measure and visualize threshold of user workload, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may specify values of work unit parameters of the users. The values of the work unit parameters may describe units of work assigned to individual users within the collaboration environment. Individual units of work may be associated with one or more of individual start dates, individual end dates, and/or other information. By way of non-limiting illustration, the values of the work unit parameters may describe a first unit of work currently assigned to a first user, other units of work assigned to the first user, and/or one or more other units of work assigned to one or more other users. The first unit of work may have a start date and an end date. Operation 202 may be performed by one or more hardware processors configured by machine-readable instructions including a component that is the same as or similar to environment state component 108, in accordance with one or more implementations.

An operation 204 may determine threshold information and/or other information. The threshold information may include individual values of a threshold parameter for the individual users. The individual values of the threshold parameter may specify individual magnitudes of units of work in relation to individual start dates and individual end dates of individual units of work. The threshold information may include a first value of the threshold parameter for the first user. The first value may specify a first magnitude of units of work for the first user in relation to the start date and the end date of the first unit of work. Operation 204 may be performed by one or more hardware processors configured by machine-readable instructions including a component that is the same as or similar to threshold component 110, in accordance with one or more implementations.

An operation 206 may effectuate presentation of a user interface based on one or more of the values of the work unit parameter, values of the threshold parameter for the individual users, and/or other information. An instance of the user interface may display the relationship between individual magnitudes of units of work and the individual start dates and the individual end dates of the individual units of work. By way of non-limiting illustration, a user interface may display the relationship between the first magnitude of units of work and the start date and the end date of the first unit of work for the first user. Operation 206 may be performed by one or more hardware processors configured by machine-readable instructions including a component that is the same as or similar to user interface component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide a user interface based on threshold of user workload, the system comprising:
    one or more physical processors configured by machine-readable instructions to:
        effectuate communication of user interface information defining a user interface of a virtual collaboration environment to a client computing platform associated with a user of the virtual collaboration environment to cause the client computing platform to present the user interface, the user interface being configured to facilitate interaction by the user with the virtual collaboration environment, the virtual collaboration environment managing work unit records describing units of work assigned to the user who is expected to accomplish one or more actions to complete the units of work, the user interface displaying a relationship between a threshold of user workload for the user and individual spans of days associated with individual ones of the units of work assigned to the user, the user interface including a threshold display portion presented with a work unit display portion and sharing a common date axis,
            the threshold display portion displaying a line representing the threshold of user workload for the user, and including the common date axis representing dates and a magnitude axis representing user workload, such that the line representing the threshold of user workload for the user is plotted relative the magnitude axis and the relationship with the individual spans of days is shown relative the common date axis, and
            the work unit display portion displaying individual interface elements corresponding to the individual ones of the units of work assigned to the user, the individual interface elements having individual lengths spanning the common date axis based on the individual spans of days associated with the individual ones of the units of work; and
        responsive to selection and repositioning of the individual interface elements within the work unit display portion:
            update the environment state information by changing one or more of the individual spans of days associated with the individual ones of the units of work, the threshold of user workload for the user, or individual user assignments of the individual ones of the units of works in accordance with the repositioning.

2. The system of claim 1, wherein the one or more physical processors are further configured by the machine-readable instructions to determine the threshold of user workload for the user.

3. The system of claim 2, wherein the one or more physical processors are further configured by the machine-readable instructions to determine the threshold of user workload for the user based on a set of units of work the user has completed in the past.

4. The system of claim 1, wherein the threshold of user workload for the user is measured based on quantity of units of work.

5. The system of claim 1, wherein the threshold of user workload for the user is measured based on quantity of units of time.

6. The system of claim 5, wherein the one or more physical processors are further configured by the machine-readable instructions to:
    determine individual quantities of units of time per day that the user is able to work.

7. The system of claim 6, wherein the one or more physical processors are further configured by the machine-readable instructions to:
    aggregate, for individual days, the individual quantities of units of time per day determined for the individual days.

8. The system of claim 1, wherein the threshold of user workload for the user is specified through user input into the user interface by the user.

9. The system of claim 1, wherein the one or more physical processors are further configured by the machine-readable instructions to:
    obtain user role information specifying a role of the user; and
    determine the threshold of user workload for the user based on the role.

10. The system of claim 1, wherein the one or more physical processors are further configured by the machine-readable instructions to:
    obtain indications of completion of the individual ones of the units of work by the user; and
    update the threshold of user workload for the user based on the completion of the individual ones of the units of work by the user.

11. A method to provide a user interface based on threshold of user workload, the method comprising:
    effectuating communication of user interface information defining a user interface of a virtual collaboration environment to a client computing platform associated with a user of the virtual collaboration environment to cause the client computing platform to present the user interface, the user interface being configured to facilitate interaction by the user with the virtual collaboration environment, the virtual collaboration environment managing work unit records describing units of work assigned to the user who is expected to accomplish one or more actions to complete the units of work, the user interface displaying a relationship between a threshold of user workload for the user and individual spans of days associated with individual ones of the units of work assigned to the user, the user interface including a threshold display portion presented with a work unit display portion and sharing a common date axis,

- the threshold display portion displaying a line representing the threshold of user workload for the user, and including the common date axis representing dates and a magnitude axis representing user workload, such that the line representing the threshold of user workload for the user is plotted relative the magnitude axis and the relationship with the individual spans of days is shown relative the common date axis, and
- the work unit display portion displaying individual interface elements corresponding to the individual ones of the units of work assigned to the user, the individual interface elements having individual lengths spanning the common date axis based on the individual spans of days associated with the individual ones of the units of work; and responsive to selection and repositioning of the individual interface elements within the work unit display portion:
updating the environment state information by changing one or more of the individual spans of days associated with the individual ones of the units of work, the threshold of user workload for the user, or individual user assignments of the individual ones of the units of works in accordance with the repositioning.

12. The method of claim 11, further comprising determining the threshold of user workload for the user.

13. The method of claim 12, wherein the determining the threshold of user workload for the user is based on a set of units of work the user has completed in the past.

14. The method of claim 11, wherein the threshold of user workload for the user is measured based on quantity of units of work.

15. The method of claim 11, wherein the threshold of user workload for the user is measured based on quantity of units of time.

16. The method of claim 15, further comprising:
determining individual quantities of units of time per day that the user is able to work.

17. The method of claim 16, further comprising:
aggregating, for individual days, the individual quantities of units of time per day determined for the individual days.

18. The method of claim 11, wherein the threshold of user workload for the user is specified through user input into the user interface by the user.

19. The method of claim 11, further comprising:
obtaining user role information specifying a role of the user; and
determining the threshold of user workload for the user based on the role.

20. The method of claim 11, further comprising:
obtaining indications of completion of the individual ones of the units of work by the user; and
updating the threshold of user workload for the user based on the completion of the individual ones of the units of work by the user.

* * * * *